US010693877B2

(12) United States Patent
Feng et al.

(10) Patent No.: US 10,693,877 B2
(45) Date of Patent: *Jun. 23, 2020

(54) EVALUATING SECURITY OF DATA ACCESS STATEMENTS

(71) Applicant: International Business Machines Corporation, Armonk, NY (US)

(72) Inventors: Hao Feng, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 14/338,359

(22) Filed: Jul. 23, 2014

(65) Prior Publication Data

US 2014/0337916 A1  Nov. 13, 2014

Related U.S. Application Data

(63) Continuation of application No. 14/223,339, filed on Mar. 24, 2014, now Pat. No. 9,680,830.

(30) Foreign Application Priority Data

Mar. 27, 2013 (CN) .......................... 2013 1 0102163

(51) Int. Cl.
*H04L 29/06* (2006.01)
*G06F 21/57* (2013.01)

(52) U.S. Cl.
CPC ............ *H04L 63/10* (2013.01); *G06F 21/577* (2013.01); *H04L 63/14* (2013.01)

(58) Field of Classification Search
CPC ........ H04L 63/10; H04L 63/14; G06F 21/577
(Continued)

(56) References Cited

U.S. PATENT DOCUMENTS 6,023,697 A * 2/2000 Bates ...................... G10L 15/22
6,073,129 A * 6/2000 Levine ................. G06F 12/0813
(Continued)

FOREIGN PATENT DOCUMENTS

CN       101901219 A     12/2010
CN    201110003699        5/2011
(Continued)

OTHER PUBLICATIONS

Javidi et al, "An overview of anomaly Based Database Intrusion Detection Systems," Indian Journal of Science and Technology, v. 5, Issue 10, pp. 3550-3559, Oct. 2012.
(Continued)

*Primary Examiner* — Abu S Sholeman
(74) *Attorney, Agent, or Firm* — Donald J. O'Brien

(57) ABSTRACT

Techniques are provided for evaluating the security of data access statements. Specifically, in one embodiment of the claimed subject matter there is provided a technique for evaluating the security of data access statements, comprising: evaluating the criticality of multiple SQL statements contained in multiple sessions accessing a database; generating a critical item set from the multiple sessions, each element in the critical item set indicating one or more SQL statements contained in a session; extracting at least one association rule from the critical item set, each of the at least one association rule indicating a sequence of SQL statements contained in a session; and calculating the criticality of each of the at least one association rule.

9 Claims, 7 Drawing Sheets

(58) Field of Classification Search
USPC .......................................... 726/1, 20, 22, 24
See application file for complete search history.

(56) References Cited

U.S. PATENT DOCUMENTS

| | | | |
|---|---|---|---|
| 6,301,575 B1 | 10/2001 | Chadha | |
| 6,446,062 B1 | 9/2002 | Levine et al. | |
| 7,660,792 B2 | 2/2010 | Brewer et al. | |
| 7,836,004 B2 | 11/2010 | Roth et al. | |
| 7,962,483 B1* | 6/2011 | Thomas | G06N 5/025 |
| | | | 707/736 |
| 8,126,874 B2 | 2/2012 | Sercinoglu et al. | |
| 8,209,697 B2 | 6/2012 | Kobayashi et al. | |
| 9,680,830 B2 | 6/2017 | Feng et al. | |
| 2001/0031457 A1* | 10/2001 | Pfenninger | G09B 5/00 |
| | | | 434/350 |
| 2002/0072896 A1 | 6/2002 | Roberge et al. | |
| 2002/0091945 A1 | 7/2002 | Ross | |
| 2002/0111932 A1 | 8/2002 | Roberge et al. | |
| 2003/0110153 A1 | 6/2003 | Shee | |
| 2004/0260947 A1* | 12/2004 | Brady | H04L 63/1425 |
| | | | 726/23 |
| 2006/0059154 A1 | 3/2006 | Raab | |
| 2007/0027896 A1* | 2/2007 | Newport | H04L 67/1095 |
| 2007/0271570 A1 | 11/2007 | Brown et al. | |
| 2008/0046964 A1* | 2/2008 | Muralidharan | G06F 21/6227 |
| | | | 726/1 |
| 2009/0144344 A1 | 6/2009 | McBride et al. | |
| 2010/0185603 A1* | 7/2010 | Phibbs | G06F 17/30451 |
| | | | 707/721 |
| 2010/0287214 A1 | 11/2010 | Narasayya et al. | |
| 2011/0040733 A1 | 2/2011 | Sercinoglu et al. | |
| 2011/0145929 A1 | 6/2011 | Jho et al. | |
| 2011/0277034 A1 | 11/2011 | Hanson | |
| 2012/0047570 A1 | 2/2012 | Chan et al. | |
| 2012/0254242 A1* | 10/2012 | Kanagasabapathi | G06N 5/025 |
| | | | 707/776 |
| 2012/0265726 A1 | 10/2012 | Padmanabhan et al. | |
| 2014/0032491 A1 | 1/2014 | Neerincx et al. | |
| 2014/0040182 A1 | 2/2014 | Gilder et al. | |
| 2014/0081993 A1 | 3/2014 | Redfem et al. | |
| 2014/0201838 A1 | 7/2014 | Varsanyi et al. | |
| 2014/0214784 A1 | 7/2014 | Seo et al. | |
| 2014/0215605 A1 | 7/2014 | Decime et al. | |
| 2014/0280259 A1 | 9/2014 | McGillin et al. | |
| 2014/0298471 A1* | 10/2014 | Feng | H04L 63/10 |
| | | | 726/25 |
| 2015/0006511 A1 | 1/2015 | Yagoub et al. | |
| 2015/0304337 A1 | 10/2015 | Nguyen-Tuong et al. | |

FOREIGN PATENT DOCUMENTS

| | | |
|---|---|---|
| CN | 104077530 A | 10/2014 |
| KR | 100906449 B1 | 7/2009 |

OTHER PUBLICATIONS

Rao et al., "Database Security Architecture for Detection of Malicious Transactions in Database," Dept. of COmputer Engineering, S.V. National Institute of Technology, Gujarat, India, downloaded from <: http://weblidi.info.unlp.edu.ar/worldcomp2011-mirror/SAM4227.pdf> on Jan. 24, 2013.

Shafer, "Detecting Inference Attacks Using Association Rules," Rutgers University, downloaded from <http://andromeda.rutgers.edu/~gshafer/raman.pdf>, Dec. 13, 2001.

Marcus et al., "Ordinal Association Rules for Error Identifcation in Data Sets," Division of Computer Science, Dept. of Mathematical Sciences, University of Memphis, Jun. 5, 2001.

Chang et al., "Privacy-Preserving Minimg of Association Rules on Distributed Databases," IJCSNS International Journal of Computer Science and Network Security, V. 6, No. 11, pp. 259-266, Nov. 2006.

Huang Xiaoyn Xu Longfei, "A Data Mining Approach for Database Intrusion Detection," Computer Systems Applicantion 11th Issue, pp. 49-52, 2005.

"Data Mining Technology in Database Safe Examination Application Discussion," Northwest National University, Article Serial No. 1671-7597; 2009.

* cited by examiner

EVALUATING SECURITY OF DATA ACCESS STATEMENTS

CROSS-REFERENCES TO RELATED APPLICATIONS

The present application is a continuation and claims the benefit of the filing date of an application entitled, "Evaluating Security of Data Access Statements" Ser. No. 14/223,339, filed Mar. 24, 2014, assigned to the assignee of the present application, and herein incorporated by reference

FIELD OF DISCLOSURE

Various embodiments of the claimed subject matter relate to databases, and more specifically, to a method and apparatus for evaluating the security of data access statements.

BACKGROUND

With the development of computer hardware and software technology, database systems provide a growingly large data storage capacity to massive numbers of users, and the security related to accessing these database systems has also improved significantly. At present, with office automation via network in enterprises such as banks and insurance companies, database systems where sensitive information is has stored become a key object for protection. Techniques have been developed to ensure the security of a database based upon analysis of the security level of Structured Query Language (SQL) statements accessing the database and based on data mining technology. These techniques may detect the security threat of each individual SQL statement.

As databases become increasingly complex, one individual SQL statement can no longer meet the query demand of a user, and usually multiple SQL statements may therefore be involved during accessing databases. As is clear from historical experience, some individual SQL statements may pose no risk for a low risk) to sensitive information in a database but, when multiple SQL statements involved in a session are combined, they may cause serious potential security hazards.

Existing security safeguard measures cannot evaluate the potential risk of SQL statements to a database. Therefore, how to evaluate the security of a sequence comprising multiple SQL statements has become a research focus in the database field.

SUMMARY

As the Inventors herein have realized, it would be desirable to develop a technical solution capable of evaluating the risk of a session comprising multiple SQL statements and, in addition, that the technical solution combine multiple individual SQL statements and evaluate the potential risk of the session as a whole while considering the potential risk rating of each individual SQL statement in the session. Further, it would be desirable to extract an evaluation criterion from historical sessions and to process, based on the criterion, a session accessing a database system in future. For example, a corresponding action (e.g. allow the session, forbid the session or issue an alert) may be taken towards the session according to the evaluation criterion, thereby improving the security of the database system.

According to one aspect of the claimed subject matter, there is provided a technique for evaluating the security of data access statements, comprising evaluating criticality of multiple SQL statements contained in multiple sessions accessing a database; generating a critical item set from the multiple sessions, each element in the critical item set indicating one or more SQL statements contained in a session; extracting at least one association rule from the critical item set, each of the at least association rule indicating a sequence of SQL statements contained in a session; and calculating criticality of each of the at least one association rule.

In one embodiment of the claimed subject matter, there is further comprised\ranking the at least one association rule by the criticality of each of the at least one association rule; and specifying as security policy corresponding to each of the at least one association rule according to the ranking.

In one embodiment of the claimed subject matter, there is further comprised, in response to receipt of a current session accessing the database system, searching in the at least one association rule for an association rule matching the current session; and processing the current session based on a security policy corresponding to the matching association rule.

In one embodiment of the claimed subject matter, there is provided an apparatus for evaluating the security of data, access statements, comprising: an evaluating module configured to evaluate the criticality of multiple SQL statements contained in multiple sessions accessing a database; a generating module configured to generate a critical item set from the multiple sessions, each element in the critical item set indicating one or more SQL statements contained in a session; an extracting module configured to extract at least one association rule from the critical item set, each of the at least association rule indicating a sequence of SQL statements contained in a session; and a calculating module configured to calculate the criticality of each of the at least one association rule.

In one embodiment of the claimed subject matter, there are further comprised a ranking module configured to rank the at least one association ride by the criticality of each of the at least one association rule; and a specifying module configured to specify a security policy corresponding to each of the at least one association rule according to the ranking.

In one embodiment of the claimed subject matter, there are further comprised a searching module configured to, in response to receipt of a current session accessing the database system, search in the at least one association rule for an association rule matching the current session; and a processing module configured to process the current session based on a security policy corresponding to the matching association rule.

By means of the technical solution described by the various embodiments of the claimed subject matter, it is possible to adequately consider a relationship among multiple SQL statements in a session, extract association rules from historical sessions and calculate the risk rating, of an association rule on a database system so as to serve as a security rule for subsequent access to the database system. Further, according to the criticality of an association rule, a corresponding security policy may be set so as to process future sessions. Using the technical solution of the claimed subject matter, it is possible to predict the security level of a future data access session based on historical data and further improve the security of the database system.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
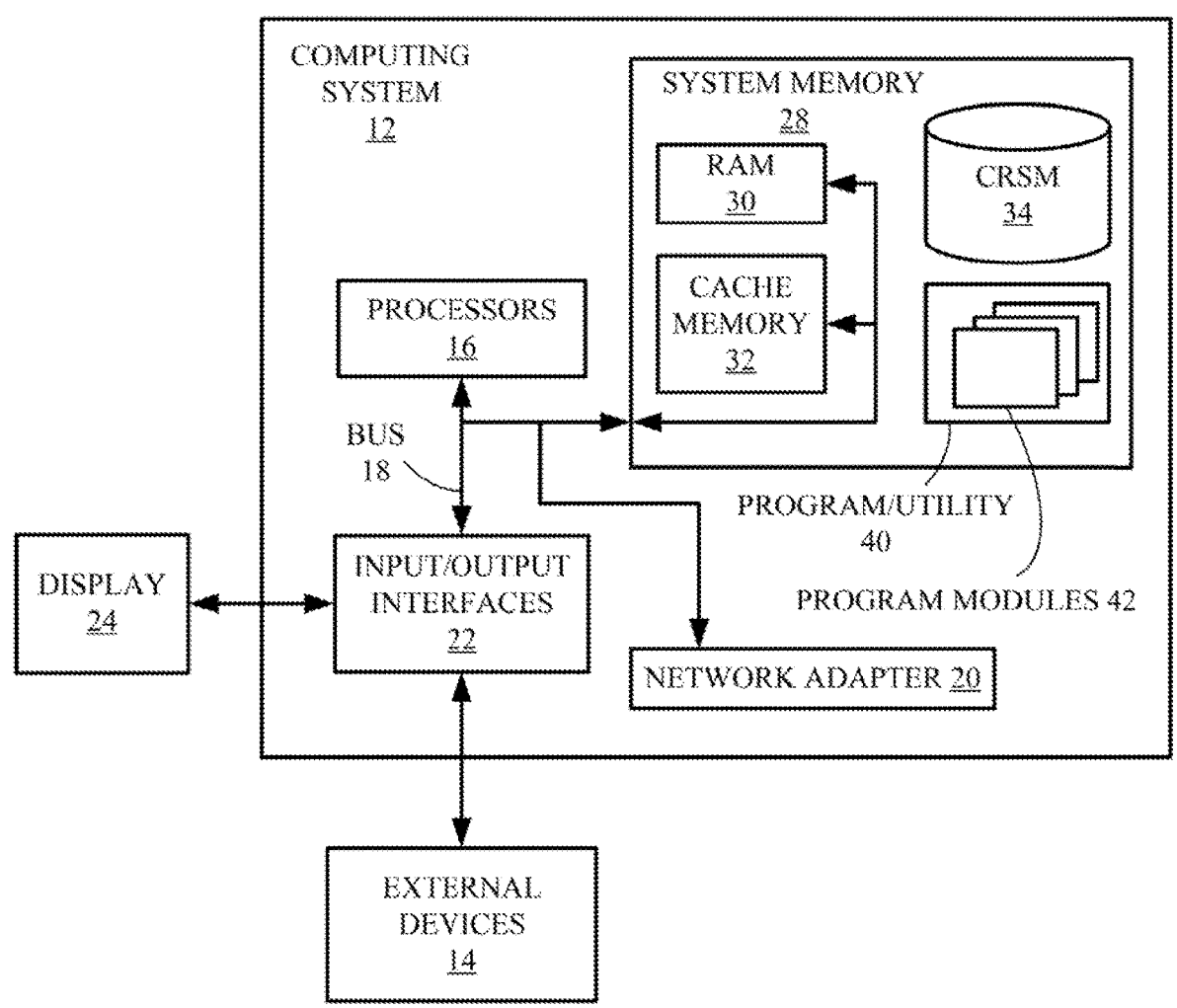
FIG. 1 schematically illustrates an exemplary computer system which is applicable to implement the embodiments of the claimed subject matter.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the claimed subject matter may be embodied as a system, method or computer program product. Accordingly, aspects of the claimed subject matter may take the form of an entirely hardware embodiment, an entirely software embodiment (including firmware, resident software, micro-code, etc.) or an embodiment combining software and hardware aspects that may all generally he referred to herein as a "circuit," "module" or "system." Furthermore, in some embodiments, aspects of the claimed subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, an electromagnetic signal, optical signal, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the claimed subject matter may be written in any combination of one or more programming languages, including an object oriented programming language such as Java, Smalltalk++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local, area network (LAN) or a wide area network (WAN), or the connection may be made to an external computer (for example, through the Internet using an Internet Service Provider).

Aspects of the claimed subject matter are described below with reference to flowchart illustrations and/or block diagrams of methods, apparatus (systems) and computer program products according to embodiments of the claimed subject matter. It will he understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block, or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational blocks to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the claimed subject matter is illustrated. Computer system/server 12 is only illustrative and is not intended to suggest any limitation as to the scope of use or functionality of embodiments of the claimed subject matter described herein.

As illustrated in FIG. 1, computer system/server 12 is illustrated in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media Such media may be any available media that is accessible by computer system/server 12, and it includes both volatile and non-volatile media, removable and non-removable media System memory 28 can include computer system readable media in the form of volatile memory, such as random access memory (RAM) 30 and/or cache memory 32. Computer system/server 12 may further include other removable/non-removable, volatile/non-volatile computer system storage media By way of example only, storage system 34 can he provided fur reading from and writing to a non-removable, non-volatile magnetic media (not illustrated in FIG. 1 and typically called a "hard drive"). Although not illustrated in FIG. 1, a magnetic disk drive for reading, from and writing, to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the claimed subject matter.

Program/utility 40, having a set (at least one) of program modules 42, may be stored in memory 28 by way of example, and not limitation, as well as an operating system, one or more application programs, other program modules, and program data Each or the operating system, one or more application programs, other program modules, and program data or some combination thereof, may include an implementation of a networking environment. Program modules 42 generally carry out the functions and/or methodologies of embodiments of the claimed subject matter as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should he understood that although not illustrated, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2A:
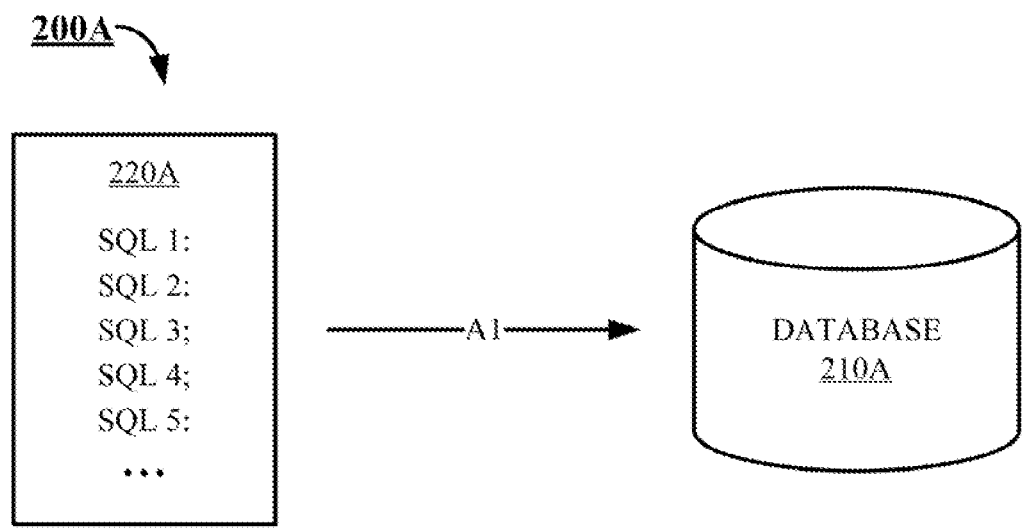
FIGS. 2A and 2B schematically illustrate respective schematic views of SQL statements accessing a database and of sessions comprising multiple SQL statements.
Figure 2B:
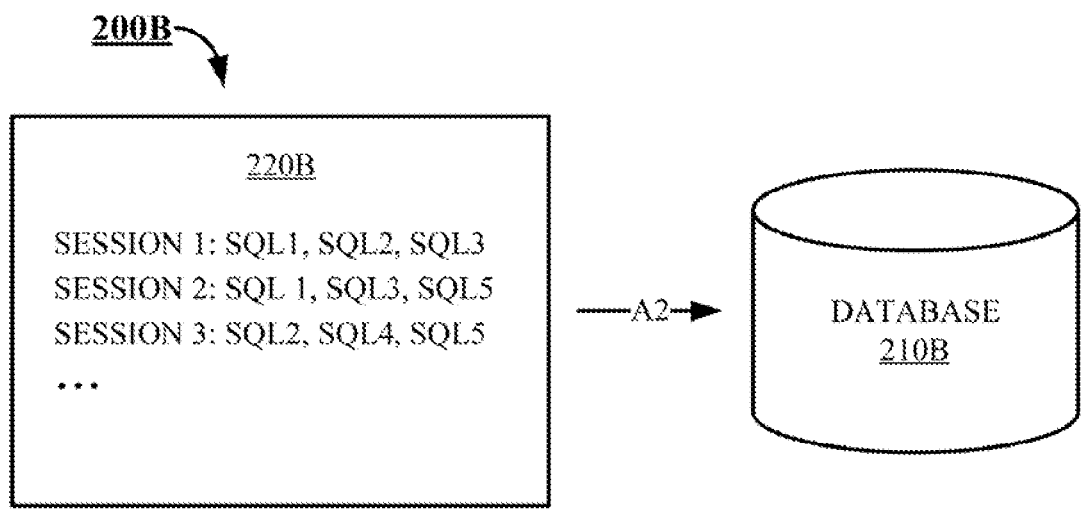

FIGS. 2A and 2B schematically illustrate respective schematic views 200A and 200B of SQL statements accessing a database and of sessions each comprising multiple SQL statements. As illustrated in FIG. 2A, a database 210A may be accessed (as illustrated by arrow A1) by separately executing a single SQL statement 220A (e.g. separately executing SQL 1, SQL 2, . . . ). When a certain SQL statement is intended to access sensitive information (e.g. bank accounts, account balances, passwords, identity card numbers, etc.) in a database system, this SQL statement is likely to be identified as a high-risk SQL statement. However, when some low-risk and even non-risk SQL statements are combined together (e.g., forming a session) for execution, then the risk level of this session can hardly discriminated.

As illustrated in FIG. 2B, in existing database access, each session usually involves multiple SQL statements. In the database access as illustrated in FIG. 2B, a session 220B may comprise multiple SQL statements that are executed in order. For example, session 1 comprises SQL 1, SQL 2 and SQL 3; session 2 comprises SQL 1, SQL 3 and SQL 5, etc. Those skilled in the art should understand while judging whether a session might endanger the security of a database, factors in two respects may be taken into consideration: one is contents of SQL statements in the session; the other is the execution order among various SQL statements. As illustrated in FIG. 2B, when session 220B accesses a database 210B (as illustrated by arrow A2), there is a need to provide a technical solution for predicting the potential risk of a session.

To eliminate the defect that the prior art can only predict the security of individual SQL statements, the various embodiments of the claimed subject matter propose a technical solution, which forms a security standard by analyzing SQL statements in historical sessions and further predicts the security rating of a session comprising multiple SQL statements based on the security standard. In one embodiment of the claimed subject matter, there is proposed a concept of criticality, which may represent a security rating when accessing a database system using one or more SQL statements. Detailed description will be presented below with reference to the accompanying drawings.

Note the various embodiments of the claimed subject matter are implemented based on data mining principles. Hereinafter, an introduction will be given to the meaning of terms in the data mining field as involved in the claimed subject matter.

The Association Rule indicates an association between events. The Association Rule may, for example, use "A->B"

to represent an association between events A and B, where A may be called "antecedent," while B called "consequent."

Support is calculated by Support(A->B)=P(A∪B). Support indicates the frequency at which events A and B occur concurrently. Specifically, if the frequency at which events A and B occur concurrently is very low, this indicates the association between events A and B is not quite close; however, if the frequency at which events A and B occur concurrently is very high, this indicates events A and B are associated all the while.

Confidence is calculated by Confidence(A->B)=P(A|B) Confidence refers to when event A occurs, whether or not event B occurs or what the probability of occurrence is. For example, if Confidence(A->B)=1, it indicates events A and B will definitely occur; if the value of Confidence(A->B) is quite low, it indicates the occurrence of event A has little to do with the occurrence of event B.

Figure 3:
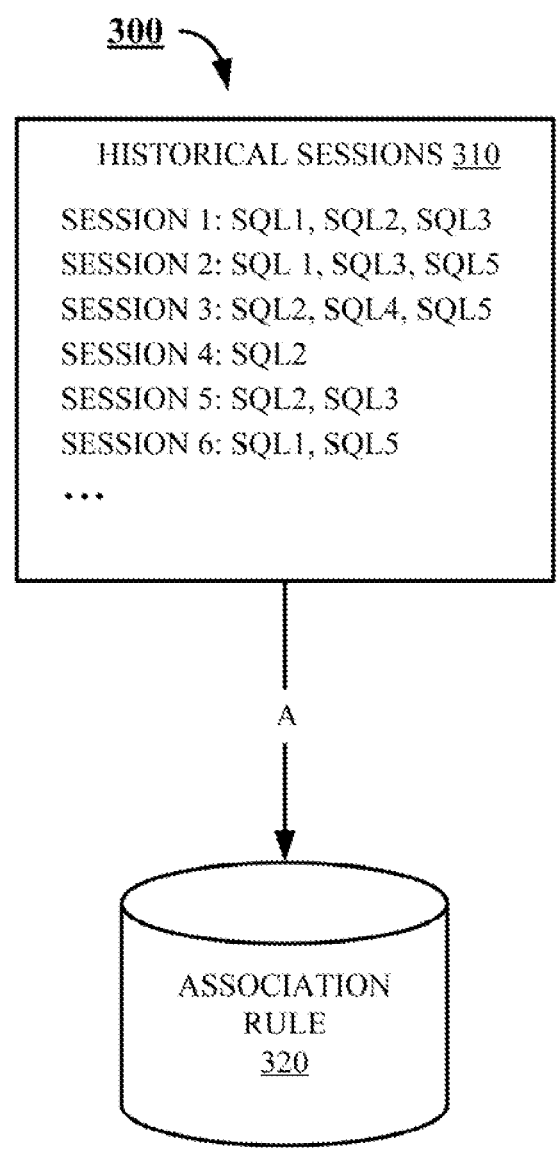
FIG. 3 schematically illustrates an architecture diagram of extracting an association rule from historical sessions according to one embodiment of the claimed subject matter.

FIG. 3 schematically illustrates an architecture diagram 300 of extracting an association rule from historical sessions according to one embodiment of the claimed subject matter. As illustrated in FIG. 3, an association rule 320 can be extracted from SQL statements contained in historical sessions 310 accessing a database system. Subsequently, in subsequent access to the database, judgment may be made as to whether or not multiple SQL statements contained in a historical session pose a potential risk to the database system, based on a risk level corresponding to the association rule. Generally speaking, here association rule 320 may define the sequential dependence between SQL statements. For example, in a session if SQL2 is executed after SQL1, then an association rule (SQL1->SQL2) may be extracted.

Specifically, according to one embodiment of the claimed subject matter, there is proposed a method for evaluating the security of data access statements, comprising: evaluating the criticality of multiple SQL statements contained in multiple sessions accessing a database; generating a critical item set from the multiple sessions, each element in the critical item set indicating one or more SQL statements contained in a session; extracting at least one association rule from the critical item set, each of the at least association rule indicating the sequence of SQL statements contained in a session; and calculating the criticality and confidence of each of the at least one association rule.

Figure 4:
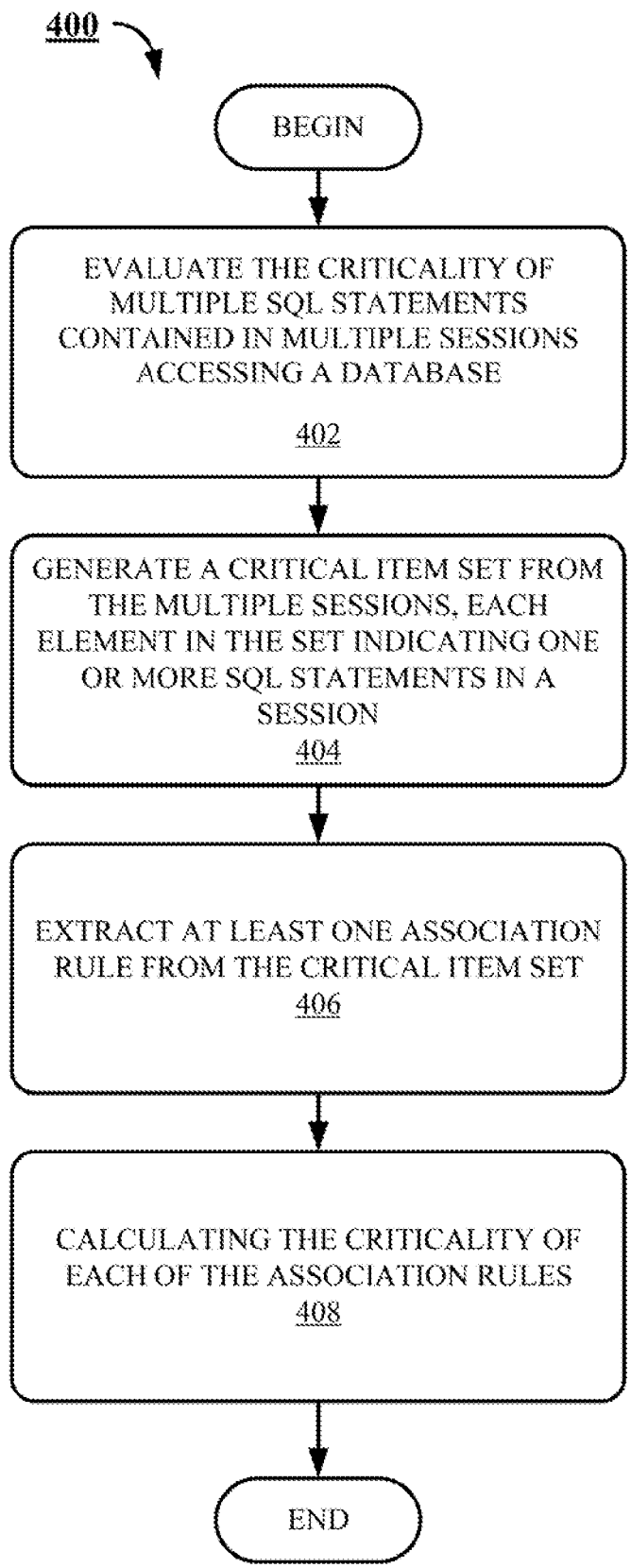
FIG. 4 schematically illustrates a flowchart of a method for evaluating the security of data access statements according to one embodiment of the claimed subject matter.

As illustrated in FIG. 4, this figure schematically illustrates a flowchart 400 of a technique for evaluating the security of data access statements according to one embodiment of the claimed subject matter. First of all, in a block 402 the criticality of multiple SQL statements contained in multiple sessions accessing a database is evaluated. Note there may exist the same SQL statements among the multiple SQL statements contained in the multiple sessions. Therefore, only one computation operation may be performed on the same two or more SQL statements.

In the context of the claimed subject matter, the criticality of an SQL statement may be construed as a security rating of using the SQL statement to access the database system. The higher the criticality is, the larger the potential threat of the SQL statement is to the database system, and vice versa In one embodiment of the claimed subject matter, an SQL statement may be split and analyzed according to business requirements. For example, when a certain statement needs to query a database table containing sensitive information in the database system, it may be considered the criticality of the SQL statement is relatively high; when the database table accessed by the SQL statement contains no sensitive information, it may be considered the criticality of the SQL statement is relatively low. Specifically, those skilled in the art may design and implement an algorithm for calculating the criticality of individual SQL statements according to concrete business requirements associated with a database system.

In a block 404, a critical item set is generated from the multiple sessions, each element in the critical item set indicating one or more SQL statements contained in a session.

The embodiments of the claimed subject matter may extract an association rule from historical sessions accessing the database system based on data mining technology. Items in the critical item set may be called elements, wherein each element may comprise one or more SQL statements contained in one Session. Critical item sets may be classified according to the number of SQL statements comprised in each element. Specifically, when each element comprises one SQL statement, the critical item set may be called critical 1-item set; when each element comprises n SQL statements, the critical item set may be called critical n-item set. The critical item set mentioned here may comprise a critical 1-item set, a critical 2-item set, . . . , and a critical n-item set.

In a block 406, at least one association rule is extracted from the critical item set, each of the at least association rule indicating the sequence of SQL statements contained in a session. In one embodiment of the claimed subject matter, the association rule describes two respects of contents: 1) which SQL statements a session comprises; and 2) the execution order among these SQL statements. For example, association rules comprising 2 SQL statements, 3 SQL statements, . . . may be extracted from the critical 2-item set, the critical 3-item set, . . . obtained in block 404, respectively.

In a block 408, the criticality of each of the at least one association rule is calculated. Like the above-described criticality of individual SQL statements, here the criticality of an association rule refers to a security rating of a sequence of SQL statements on the database system when executing these SQL statements in the association rule in order. By calculating the criticality of the association rule, the security of an SQL statement sequence comprising multiple SQL statements may be evaluated based on historical sessions, and further a basis is provided for evaluating the security of a session that is likely to take place in future.

Hereinafter, reference is made to concrete examples to illustrate the implementation of the method according to the claimed subject matter. For example, Table 1 illustrates SQL statements comprised in various historical sessions from which association rules are extracted.

TABLE 1

Original Set of Historical Sessions

| Number | Session Name | SQL Statement |
|---|---|---|
| 1 | Session 1 | SQL1, SQL2, SQL3 |
| 2 | Session 2 | SQL1, SQL3, SQL5 |
| 3 | Session 3 | SQL2, SQL4, SQL5 |
| 4 | Session 4 | SQL2 |
| 5 | Session 5 | SQL2, SQL3 |
| 6 | Session 6 | SQL1, SQL5 |

In one embodiment of the claimed subject matter, the criticality of each individual SQL statement may be calculated in a conservative way. For example, only when it is determined an SQL statement will not cause any potential risk to the database system, the criticality of the SQL statement is set as a first threshold (e.g. 0). Those skilled in the art may design, by themselves, a formula for calculating the criticality of each SQL statement based on the method described above. When the criticality of an SQL statement is represented by a decimal in a range [0, 1], the criticality of SQL1-SQL5 may be as illustrated in Table 2 below.

TABLE 2

Criticality Values of SQL Statements

| Number | SQL Statement | Criticality |
|---|---|---|
| 1 | SQL1 | 0 |
| 2 | SQL2 | 0.3 |
| 3 | SQL3 | 0.4 |
| 4 | SQL4 | 0 |
| 5 | SQL5 | 0 |

In one embodiment of the claimed subject matter, the generating a critical item set from the multiple sessions comprises: filtering at least a portion of sessions out of the multiple sessions based on the criticality of the multiple SQL statements; and generating a critical item set from the at least a portion of sessions. Embodiments of the claimed subject matter may generate the critical item set based on the data mining technology. In this regard, those sessions posing no potential risk to the database may be filtered out first, so as to reduce the number of sessions on which the generating the critical item set is based, and further to reduce the computing workload during the data mining.

In one embodiment of the claimed subject matter, the filtering at least a portion of sessions out of the multiple sessions based on the criticality of the multiple SQL statements comprises: in response to the criticality, of each SQL statement comprised in a session of the multiple sessions, having met a first threshold, deleting the session from the multiple sessions to form the at least a portion of sessions.

Note when the criticality of each SQL statement contained in a session is equal to 0, it may be considered that SQL statements in the session and their combinations will not cause any harm to the database system. At this point, these SQL statements may be deleted from the original set of historical sessions. If the original set of historical sessions retains SQL statements meeting the condition for deletion, the correctness of an extracted association rule will not be affected; nevertheless, since the original set of historical sessions usually comprises huge amount of sessions, filtering sessions that meet the condition for deletion will improve the efficiency of subsequent processing blocks. Regarding the examples as illustrated in Table 1 and Table 2, since the criticality of both SQL1 and SQL5 comprised in session 6 is 0, session 6 may be deleted. A set of filtered historical sessions is illustrated in Table 3 below, wherein this table illustrates at least a portion of sessions of the original set of historical sessions. Hereinafter, critical item sets may be generated based on the set of sessions as illustrated in Table 3.

TABLE 3

Set of Filtered Historical Sessions

| Number | Session Name | SQL Statement |
|---|---|---|
| 1 | Session 1 | SQL1, SQL2, SQL3 |
| 2 | Session 2 | SQL1, SQL3, SQL5 |
| 3 | Session 3 | SQL2, SQL4, SQL5 |
| 4 | Session 4 | SQL2 |
| 5 | Session 5 | SQL2, SQL3 |

In one embodiment of the claimed subject matter, the generating a critical item set from the at least a portion of sessions comprises: generating a critical 1-item set of the at least a portion of sessions, wherein each element in the critical 1-item set comprises one SQL statement; in at least one round, in response to a critical (n−1)-item set of the at least a portion of sessions being non-null, generating a critical n-item set of the at least a portion or sessions, wherein n≥2 and each element in a critical n-item set comprises n SQL statements that are arranged in order.

Based on the above set of filtered historical sessions as illustrated in Table 3, a critical 1-item set, a critical 2-item set, . . . may be gradually generated in multiple rounds. Continuing the examples illustrated Table 1-Table 3, now description is presented to the blocks of generating critical item sets. First of all, a critical 1-item set is generated based on the set of filtered sessions as illustrated in Table 3, each element in the critical 1-item set comprising, one SQL statement. Specifically, items in the critical 1-item set may be SQL1, SQL2, . . . SQL5. Based on principles of data mining and the above-described method, the criticality and support corresponding to each element (i.e. each SQL statement) in the critical 1-item set may be calculated. Contents of the critical 1-item set are illustrated in Table 4 below.

TABLE 4

Critical 1-Item Set

| Number | Element | Criticality | Support |
|---|---|---|---|
| 1 | SQL1 | 0 | 0.4 |
| 2 | SQL2 | 0.3 | 0.8 |
| 3 | SQL3 | 0.4 | 0.6 |
| 4 | SQL4 | 0 | 0.2 |
| 5 | SQL5 | 0 | 0.4 |

Based on the contents of the critical 1-item set, a critical 2-item set may be generated. Elements in the critical 2-item set comprise 2 SQL statements that are arranged in order. At this point, according to a permutation and combination rule, SQL statements that are likely to be executed after the SQL statement comprised in element 1 are added after the elements in the critical 1-item set. For example, regarding element 1 (SQL1) illustrated in Table 4, SQL2, SQL3, SQL4 and SQL5 may be executed after SQL1. As such, the first 5 rows of the critical 2-item set may be constructed. Those skilled in the art may also construct the critical 2-item set based on element 2 (SQL2) illustrated in Table 4, and so on and so forth. Table 5 illustrates elements comprised in the critical 2-item set. Afterwards, the criticality and support corresponding to each element may be calculated.

TABLE 5

Critical 2-Item Set

| Number | Element | Criticality | Support |
|---|---|---|---|
| 1 | SQL1, SQL2 | $0.3*\xi$ | 0.2 |
| 2 | SQL1, SQL3 | $0.4*\xi$ | 0.4 |
| 3 | SQL1, SQL4 | 0 | 0 |
| 4 | SQL1, SQL5 | 0 | 0.2 |
| 5 | SQL2, SQL3 | $1 - \xi(1 - 0.3)*(1 - 0.4)$ | 0.4 |
| 6 | SQL2, SQL4 | 0 | 0.2 |
| 7 | SQL2, SQL5 | $0.3*\xi$ | 0.2 |
| 8 | SQL3, SQL4 | $0.4*\xi$ | 0 |
| 9 | SQL3, SQL5 | $0.4*\xi$ | 0.2 |
| 10 | SQL4, SQL5 | 0 | 0.2 |

The $3^{rd}$ column in Table 5 enumerates the criticality value calculated for each element in the critical 2-item set. During calculation, the criticality may be solved based on the criticality of two SQL statements involved in an element and a function $\xi$ describing a relationship between these two SQL statements. For example, $\xi$ illustrated in Table 5 may be a function representing a relationship between two SQL statements in an element. For example, regarding the first element (SQL1, SQL2), the function $\xi$ may be a function with SQL1 and SQL2 being arguments. Those skilled in the art may define a function by themselves.

In one embodiment of the claimed subject matter, there is further comprised: in at least one round, deleting an element from the critical n-item set in response to any of: the support of the element being zero, the criticality of the element being zero.

During solving the critical n-item set, a situation might arise where multiple SQL statements in some elements pose no threat to the database system. At this point, if these elements are still retained in the critical n-item set, then the computation load of subsequent processing might be increased. Therefore, the critical n-item set may be pruned so as to improve the efficiency of data mining.

Specifically, as is clear from principles of data mining, if the support of element 1 in the critical n-item set is zero, then the support of element 2 in a critical (n+1)-item set constructed based on the element 1 is also zero, so the element 1 belongs to useless elements and can be deleted from the critical n-item set. In addition, if the criticality of element 1 in the critical n-item set is zero, then non-zero criticality element 2 in a critical (n+1)-item set constructed based on the element 1 may be generated by other elements in the critical n-item set. For example, element {SQL1, SQL2, SQL5} in a critical 3-item set may be generated based on elements {SQL1, SQL2} and {SQL2, SQL5} in the critical 2-item set. Therefore, element {SQL1, SQL5} may be removed from the critical 2-item set. By the above-described method, Table 6 illustrates the pruned critical 2-item set below.

TABLE 6

Pruned Critical 2-Item Set

| Number | Element | Criticality | Support |
|---|---|---|---|
| 1 | SQL1, SQL2 | 0.3*$\xi$ | 0.2 |
| 2 | SQL1, SQL3 | 0.4*$\xi$ | 0.4 |
| 3 | SQL2, SQL3 | $1 - \xi(1 - 0.3)*(1 - 0.4)$ | 0.4 |
| 4 | SQL2, SQL5 | 0.3*$\xi$ | 0.2 |
| 5 | SQL3, SQL5 | 0.4*$\xi$ | 0.2 |

Detailed description has been presented above to how to generate a critical 1-item set and how to generate a critical 2-item set based on the critical 1-item set. Those skilled in the art may generate a critical 3-item set based on principles described above. Table 7 illustrates an example of the critical 3-item set below.

TABLE 7

Critical 3-Item Set

| Number | Element | Criticality | Support |
|---|---|---|---|
| 1 | SQL1, SQL2, SQL3 | $1 - \beta(1 - 0.3)*(1 - 0.4)$ | 0.2 |
| 2 | SQL1, SQL3, SQL5 | $1 - \beta(1 - 0.4)$ | 0.2 |
| 3 | SQL2, SQL3, SQL5 | $1 - \beta(1 - 0.3)*(1 - 0.4)$ | 0 |

Like function $\xi$ illustrated with reference to Table 5, in Table 7, $\beta$ may be a function representing a relationship among various SQL statements in an element. For example, regarding the first element {SQL1, SQL2, SQL3} illustrated in Table 7, if these three SQL statements have no relationship among them, then the value of $\beta$ may be 1; if two of the three SQL statements have some relationship between them, then the value of $\beta$ may be less than 1; if the three SQL statements have some relationship among them, then the value of $\beta$ may be much smaller. In other words, the closer a relationship among SQL statements in an element are, the larger the value of $\beta$ is, and vice versa Hereinafter, detailed description will be presented to how to extract association rules from a critical item set. In one embodiment of the claimed subject matter, the extracting at least one association rule from the critical item set comprises: with respect to each element in the critical item set, taking the last SQL statement comprised, in the element as a consequent: taking other SQL statements in the element as antecedents; using a formula (antecedent->consequent) to represent one of the multiple association rules.

For example, regarding the first element {SQL1, SQL2} in the critical 2-item set as illustrated in Table 5, an extracted association rule may be represented as (SQL1->SQL2); regarding the first element {SQL1, SQL2, SQL3} in the critical 3-item set as illustrated in Table 7, an extracted association rule may be represented as (SQL1-> SQL2->SQL3). An association rule may represent a sequence of SQL statements comprised in a session. After extracting the association rules, the criticality and support of each association rule need to be calculated. Table 8 illustrates association rules extracted from the above-illustrated critical item sets and their relevant confidence and criticality.

TABLE 8

Association Rules and Relevant Confidence and Criticality

| Number | Association Rule | Confidence | Criticality |
|---|---|---|---|
| 1 | SQL1->SQL3 | 0.4/0.4 = 1 | 0.4*$\xi$ |
| 2 | SQL3->SQL1 | 0.4/0.6 = 0.667 | 0.4*$\xi$ |
| 3 | SQL1->SQL2 | 0.2/0.4 = 0.5 | 0.3*$\xi$ |
| 4 | SQL2->SQL1 | 0.2/0.8 = 0.25 | 0.3*$\xi$ |
| 5 | SQL2->SQL3 | 0.4/0.8 = 0.5 | $1 - \xi(1 - 0.3)*(1 - 0.4) = 1 - 0.42\xi$ |
| 6 | SQL3->SQL2 | 0.4/0.6 = 0.667 | $1 - 0.42\xi$ |
| ... | ... | ... | ... |

In one embodiment of the claimed subject matter, the calculating the criticality of each of the at least one association rule comprises: with respect to each association rule, calculating the criticality of the association rule based on the criticality of an antecedent and the criticality of a consequent in the association rule and on a relationship between the antecedent and the consequent.

In the embodiments of the claimed subject matter, a method for calculating the criticality of an association rule may be the same as that for calculating the criticality of an element in a critical item set as described above. For example, a result calculated based on the criticality of an antecedent and the criticality of a consequent may be multiplied by a coefficient representing a relationship between the antecedent and the consequent, so as to represent the criticality of the rule more accurately. Specifically, the coefficient may be a value in a range [0, 1].

In one embodiment of the claimed subject matter, there is further comprised: ranking the at least one association rule by the criticality of each of the at least one association rule; and specifying a security policy corresponding to each of the at least one association rule according to the ranking.

An association rule may represent a sequence of SQL statements contained in a session, while its criticality may represent a rating of the sequence on potential risks to the database system. Therefore, association rules may be ranked by the criticality in descending order of risk. An appropriate security policy may be assigned to each association, rule according to the ranks from high to low. For example, it may be provided in a security policy: when a certain session meets a high-risk association rule, the session is terminated; or when a certain session meets a low-risk association rule, the session may be continued.

Those skilled in the art may define, by themselves, a data structure for saving a security policy. For example, for the simplicity purpose a "security policy" column may be added to the table as illustrated in Table 8, with a concrete format illustrated in Table 9 below.

TABLE 9

Association Rules and Relevant Security Policies

| Number | Association Rule | Confidence | Criticality | Security Policy |
|---|---|---|---|---|
| 1 | SQL1->SQL3 | 0.4/0.4 = 1 | $0.4*\xi$ | Alert |
| ... | ... | ... | ... | ... |
| n | SQL1->SQL2->SQL3 | 0.5 | $1 - \beta(1 - 0.3)*(1 - 0.4)$ | Terminate |
| ... | ... | ... | ... | ... |

In one embodiment of the claimed subject matter, the ranking the at least one association rule by the criticality of each of the at least one association rule comprises: in response to the criticality of two of the at least one association rule being equal, with respect to each of the two association rules, calculating the confidence of the association rule based on the support of the association rule and the support of an antecedent in the association rule; and ranking the two association rules by the confidence of the two association rules.

According to the embodiments of the claimed subject matter, the criticality and confidence associated with each association rule has been calculated. The criticality may measure, to a certain extent, a potential risk rating of an SQL sequence in the association rule on the database system. However, if the criticality of two association rules is equal, then these two association rules cannot be ranked. At this point, since an association rule with higher confidence usually implies a larger potential risk, the confidence of association rules may further he taken into consideration.

Since the confidence of an association rule may indicate the probability that a consequent occurs when an antecedent occurs, the higher the confidence is, the larger the probability, that the antecedent and the consequence in the association rule occur together, is. Specifically, with reference to association rule 1 (SQL1->SQL3) and association rule 2 (SQL3->SQL1) in Table 8, although the criticality of the association rule 1 and the association rule 2 is equal ($0.4*\xi$), the probability that SQL3 occurs after SQL1 is higher than the probability that SQL1 occurs after SQL3, so it may be considered a potential critical level of the association rule 1 is much higher.

In one embodiment of the claimed subject matter, there is further comprised: in response to receipt of a current session accessing the database system, searching in the at least one association rule for an association rule matching the current session; and processing the current session based on a security policy corresponding to the matching association rule. Detailed description will be presented with reference to FIG. 5 below.

Figure 5:
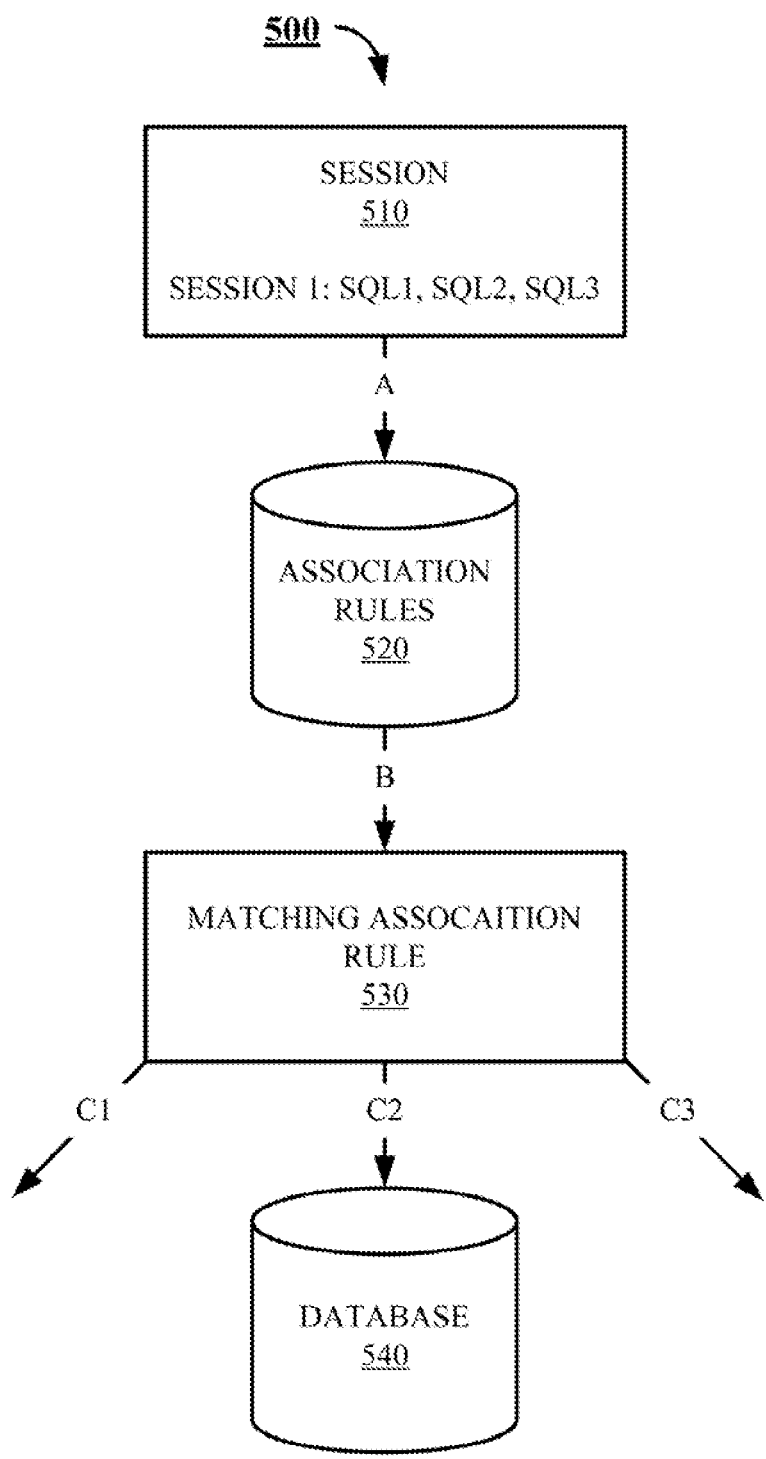
FIG. 5 schematically illustrates an architecture diagram of processing a current session accessing the database based on an association rule according to one embodiment of the claimed subject matter.

FIG. 5 schematically illustrates an architecture diagram 500 of processing a current session accessing the database based on an association rule according to one embodiment of the claimed subject matter. After successfully building association rules, the potential threat of a session accessing the database system to the database system may be judged using an association rule. At this point, an association rule matching a session 510 is looked up in association rules 520 (as illustrated by arrow A); next, a matching association rule 530 is outputted (as illustrated by arrow B), and based on association rule 530 it is decided whether to issue an alert (as illustrated by arrow C1), allow access to a database 540 (as illustrated by arrow C2) or terminate access (as illustrated by arrow C3).

Figure 6:
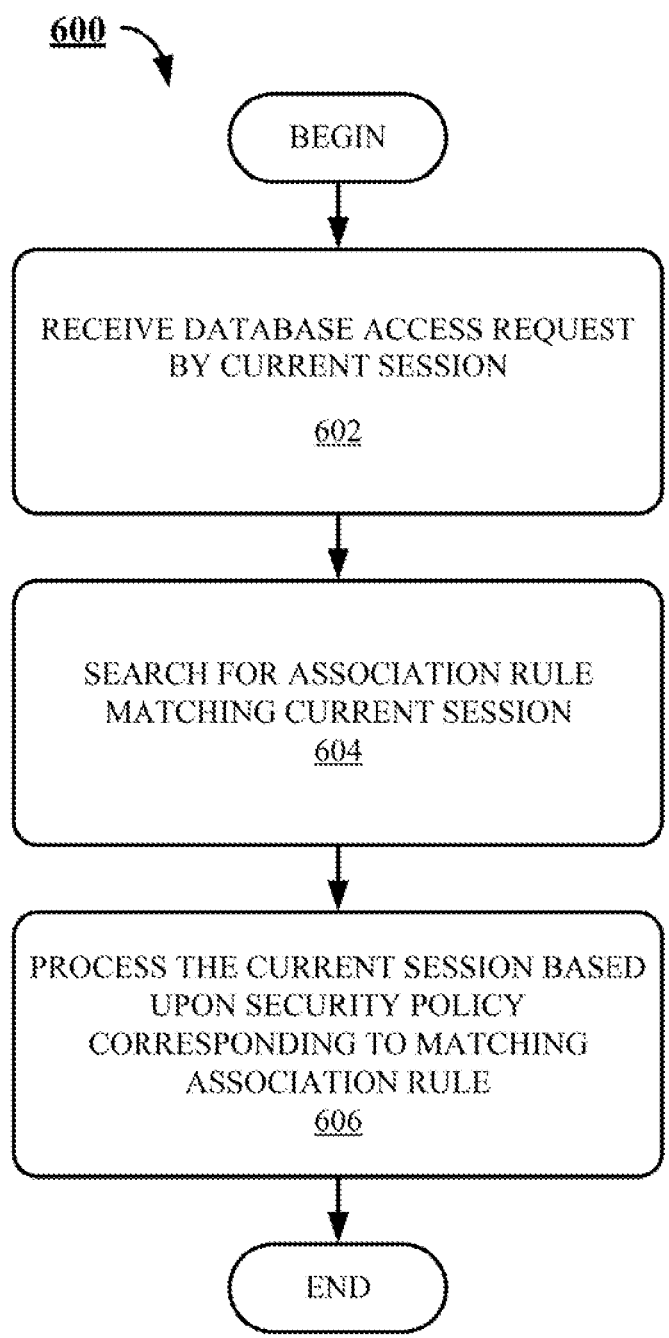
FIG. 6 schematically illustrates a flowchart of processing a current session accessing the database according, to one embodiment of the claimed subject matter.

FIG. 6 schematically illustrates a flowchart 600 of processing a current session accessing the database according to one embodiment of the claimed subject matter. Based on association rules extracted from historical sessions and corresponding security policies, a session accessing the database system may be processed reasonably.

In a block 602, a current session accessing the database is received. Here the current session may be one or more sessions, and the claimed subject matter is not intended to limit whether multiple sessions are executed in parallel or in series. Next in a block 604, an association rule matching the current session is searched for in at least one association rule. For example, suppose the current session comprises three SQL statements: SQL1, SQL2 and SQL3, then it is found from the association rules as illustrated in Table 9 that the $n^{th}$ association rule (SQL1->SQL2->SQL3) matches the current session. Finally in a block 606, the current session is processed based on a security policy corresponding to the matching association rule. As is clear from a security policy "Terminate" corresponding to the $n^{th}$ association rule, the current session belongs to high-risk sessions and should be terminated so as to avoid possible threats to the database system.

In one embodiment of the claimed subject matter, based on the processing of the current session, an association rule and its relevant criticality, confidence and security rule may be updated in real time so as to serve as a criterion based on which subsequent sessions are processed.

Figure 7:
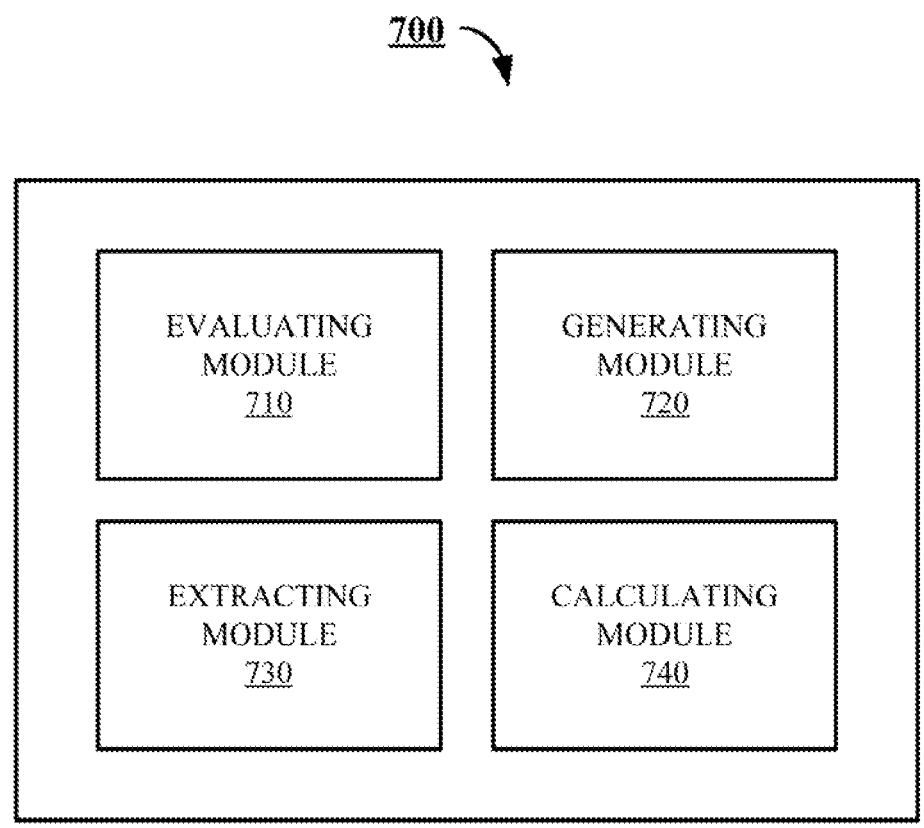
FIG. 7 schematically illustrates a block diagram of an apparatus for evaluating the security of data access statements according to one embodiment of the claimed subject matter.

FIG. 7 schematically illustrates a block diagram 700 of an apparatus for evaluating the security of data access statements according to one embodiment of the claimed subject matter. Specifically. FIG. 7 illustrates an apparatus for evaluating the security of data access statements, comprising: an evaluating module 710 configured to evaluate the criticality of multiple SQL statements contained in multiple sessions accessing a database; a generating module 720 configured to generate a critical item set from the multiple sessions, each element in the critical item set indicating one or more SQL statements contained in a session: an extracting module 730 configured to extract at least one association rule from the critical item set, each of the at least association rule indicating the sequence of SQL statements contained in a session; and a calculating module 740 configured to calculate the criticality of each of the at least one association rule.

In one embodiment of the claimed subject matter, generating module 720 comprises: a filtering module configured to filter at least a portion of sessions out of the multiple sessions based on the criticality of the multiple SQL statements; a first generating module configured to generate a critical item set from the at least a portion of sessions.

In one embodiment of the claimed subject matter, the filtering module comprises: a deleting module configured to in response to the criticality, of each SQL statement comprised in a session of the multiple sessions, having met a first threshold, delete the session from the multiple sessions to form the at least a portion of sessions.

In one embodiment of the claimed subject matter, generating module 720 comprises: a second generating module configured to generate a critical 1-item set of the at least a portion of sessions, wherein each element in the critical 1-item set comprises one SQL statement; a third generating module configured to in at least one round, in response to a critical (n−1)-item set of the at least a portion of sessions being non-null, generate a critical n-item set of the at least a portion of sessions, wherein n≥2 and each element in a critical n-item set comprises n SQL statements that are arranged in order.

In one embodiment of the claimed subject matter, there is further comprised: a pruning module :configured to in at least one round, delete an element from the critical n-item set in response to any of the support of the element being zero, the criticality of the element being zero.

In one embodiment of the claimed subject matter, extracting module 730 comprises: a first extracting module configured to with respect to each element in the critical item set, take the last SQL statement contained in the element as a consequent; a second extracting module configured to take other SQL statements in the element as antecedents; and an associating module configured to use a formula (antecedent->consequent) to represent one of the multiple association rules.

In one embodiment of the claimed subject matter, calculating module 740 comprises: a first calculating module configured to with respect to each association rule, calculate the criticality of the association rule based on the criticality of an antecedent and the criticality of a consequent in the association rule and on a relationship between the antecedent and the consequent.

In one embodiment of the claimed subject matter, there is further comprised: a ranking module configured to rank the at least one association rule according to the criticality of each of the at least one association rule; and a specifying module configured to specify a security policy corresponding to each of the at least one association rule according to the ranking.

In one embodiment of the claimed subject matter, the ranking module comprises: a second calculating module configured to in response to the criticality of two of the at least one association rule being equal, with respect to each of the two association rules, calculate the confidence of the association rule based on the support of the association rule and the support of an antecedent in the association rule; and a first ranking module configured to rank the two association rules according to the confidence of the two association rules.

In one embodiment of the claimed subject matter, there is further comprised: a searching module configured to in response to receipt of a current session accessing the database system, search in the at least one association rule for an association rule matching the current session; and a processing module configured to process the current session based on a security policy corresponding to the matching association rule.

The flowchart and block diagrams in the Figures illustrate the architecture, functionality, and operation of possible implementations of systems, methods and computer program products according to various embodiments of the claimed subject matter. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also he noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the claimed subject matter have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for evaluating data access statements with respect to database security, comprising:
   evaluating criticality of two or more Structured Query Language (SQL) statements, each statement from a different session of two or more sessions accessing, from a first computing system, a database implemented on a data server;
   generating, on the data server, a critical item set from the two or more sessions, each element in the critical item set indicating one or more SQL statements in a session of the two or more sessions;
   extracting at least one association rule from the critical item set, each of the at least one association rule indicating a sequence of SQL statements in a session of the two or more sessions;
   calculating criticality of each of the at least one association rule;
   evaluating a session based upon a criticality of the at least one association rule;
   terminating, by the data server, the session based upon a result of the evaluating the session based upon the criticality;
   ranking, by the data server, at least two association rules by the criticality of each of the at least two association rules; and
   specifying, the data server, a security policy corresponding to each of the at least two association rules according to the ranking.

2. The method according to claim 1, wherein the generating a critical item set from the multiple sessions comprises:
   filtering at least a portion of sessions out of the multiple sessions based on the criticality of the multiple SQL statements; and generating a critical item set from the at least a portion of sessions.

3. The method according to claim 2, wherein the filtering at least a portion of sessions out of the multiple sessions based on the criticality of the multiple SQL statements comprises, in response to the criticality, of each SQL statement contained in a session of the multiple sessions, having met a first threshold, deleting the session from the multiple sessions to form the at least a portion of sessions.

4. The method according to claim 1, wherein the generating a critical item set from the multiple sessions comprises:
generating a critical 1-item set of the at least a portion of sessions, wherein each element in the critical 1-item set comprises one SQL statement;
in at least one round, in response to a critical (n−1)-item set of the at least a portion of sessions being non-null, generating a critical n-item set of the at least a portion of sessions, wherein n≥2 and each element in the critical n-item set comprises n SQL statements that are arranged in order.

5. The method according to claim 4, further comprising in the at least one round, deleting an element from the critical n-item set in response to any of: the support of the element being zero, and the criticality of the element being zero.

6. The method according to claim 4, wherein the extracting at least one association rule from the critical item set comprises:
with respect to each element in the critical item set, taking the last SQL statement contained in the element as a consequent;
taking other SQL statements in the element as antecedents; and
using a formula (antecedent->consequent) to represent one of the multiple association rules.

7. The method according to claim 1, wherein the calculating the criticality of each of the at least one association rule comprises, with respect to each association rule, calculating the criticality of the association rule based on criticality of an antecedent and criticality of a consequent in the association rule, and on a relationship between the antecedent and the consequent.

8. The method according to claim 1, wherein the ranking the at least one association rule by the criticality of each of the at least one association rule comprises:
in response to the criticality of two of the at least one association rule being equal, with respect to each of the two association rules, calculating the confidence of the association rule based on the support of the association rule and the support of an antecedent in the association rule; and
ranking the two association rules by the confidence of the two association rules.

9. The method according to claim 1, further comprising:
in response to receipt of a current session accessing the database system, searching in the at least one association rule for an association rule matching the current session: and processing the current session based on a security policy corresponding to the matching association rule.

* * * * *